(12) United States Patent
Oki et al.

(10) Patent No.: US 6,971,438 B2
(45) Date of Patent: Dec. 6, 2005

(54) VEHICLE RADIATOR DEVICE

(75) Inventors: Kenji Oki, Saitama (JP); Shin Nabeya, Saitama (JP); Yoshiyuki Sekiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/024,560

(22) Filed: Dec. 21, 2001

(65) Prior Publication Data
US 2002/0112680 A1  Aug. 22, 2002

(30) Foreign Application Priority Data
Dec. 28, 2000  (JP)  .............................. 2000-403153

(51) Int. Cl.$^7$ ............................................... B60H 1/00
(52) U.S. Cl. ............................. 165/41; 165/51; 165/69; 165/905; 180/68.1; 180/68.4; 123/196 AB
(58) Field of Search ............................ 165/41, 47, 51, 165/69, 905; 180/68.1, 68.2, 68.3, 68.4; 123/196 AB

(56) References Cited

U.S. PATENT DOCUMENTS

| | | | |
|---|---|---|---|
| 3,775,972 A | * | 12/1973 | Perpall ..................... 165/69 X |
| 3,799,128 A | | 3/1974 | Small |
| 4,120,271 A | | 10/1978 | Edmaier |
| 4,295,521 A | * | 10/1981 | Sommars ..................... 165/69 |
| 4,412,515 A | * | 11/1983 | Fritzenwenger |
| 4,492,267 A | * | 1/1985 | Cadars ................... 165/905 X |
| 4,641,721 A | | 2/1987 | Yamaguchi |
| 4,828,017 A | * | 5/1989 | Watanabe et al. ............. 165/41 |
| 5,145,023 A | * | 9/1992 | Tsurumi et al. ............ 180/68.1 |
| 5,267,624 A | | 12/1993 | Christensen |
| 5,307,865 A | * | 5/1994 | Inagaki et al. ................ 165/41 |
| 5,704,418 A | | 1/1998 | Baader et al. |
| 5,715,778 A | * | 2/1998 | Hasumi et al. ........... 165/51 X |
| 5,758,716 A | * | 6/1998 | Shibata .................... 165/51 X |
| 5,865,244 A | * | 2/1999 | Moser .................... 165/905 X |
| 6,209,627 B1 | * | 4/2001 | Hasumi ................. 180/68.1 X |
| 6,325,169 B1 | * | 12/2001 | Tateshima et al. |

FOREIGN PATENT DOCUMENTS

| | | |
|---|---|---|
| CN | 1276307 A | 12/2000 |
| DE | 1031680 B | 6/1996 |
| GB | 1 456 558 A | 11/1976 |
| GB | 2184700 A | 7/1987 |
| JP | 2649179 | 7/1990 |
| JP | 8-4530 A | 1/1996 |
| JP | 8-110191 A | 4/1996 |
| RU | 2059842 | 5/1996 |

OTHER PUBLICATIONS

Non-translated Russian language publication as indicated in the English language translation of the Vietnamese Search Report dated Oct. 17, 2003.

* cited by examiner

Primary Examiner—Ljiljana Ciric
(74) Attorney, Agent, or Firm—Birch, Stewart, Kolasch & Birch, LLP

(57) ABSTRACT

A vehicle radiator device having a radiator with a first tank and a second tank coupled through a heat radiation core. The radiator is mounted onto an engine in a power unit supported by a vehicle body frame. The first and second tanks of the radiator are made of synthetic resin. The radiator is mounted onto the engine through a shroud for conducting cooling wind passing through the radiator. The shroud is made of elastic material for conducting cooling so that vibrations of the engine are absorbed by the elasticity of the shroud, thus preventing vibration of the radiator.

14 Claims, 9 Drawing Sheets

VEHICLE RADIATOR DEVICE

CROSS-REFERENCE TO RELATED APPLICATIONS

The present application claims priority under 35 USC 119 to Japanese Patent Application No. 2000-403153 filed on Dec. 28, 2000 the entire contents thereof is hereby incorporated by reference.

BACKGROUND OF THE INVENTION

1. Field of the Invention

The present invention relates to an improvement in a vehicle radiator device having a radiator with a first tank and a second tank coupled through a heat radiation core is mounted onto an engine in a power unit and supported by a vehicle body frame. The first tank communicates to an inlet of a water jacket of the engine, and the second tank communicates to an outlet of the water jacket.

2. Description of Background Art

A vehicle radiator device has been disclosed in, for example, Official Patent Gazette No. 2649179.

This conventional vehicle radiator device is advantageous in simplifying the piping between engine and radiator. However, in order to prevent the radiator from being excited by the engine, this conventional radiator must be mounted onto the engine through special elastic supporting means, and this elastic supporting means must have a comparatively large load capacity, because the radiator is comparatively heavy. This makes cost reduction difficult to achieve.

The present invention addresses above-described problem, and is aimed at providing a vehicle radiator device that is a simple, low-priced structure having reduced weight, and which is supported by the engine in such a manner as to isolate vibrations.

SUMMARY AND OBJECTS OF THE INVENTION

In order to achieve the above-described object, according to a first special feature of the present invention a vehicle radiator device having a radiator with a first tank and a second tank coupled through a heat radiation core is mounted onto an engine in a power unit to be supported by a vehicle body frame. The first tank communicates to an inlet of a water jacket of the engine, and the second tank communicates to an outlet of the water jacket. The first and second tanks of the radiator are made of light-weight synthetic resin, and the radiator is mounted onto the engine through a shroud made of light-weight elastic material for conducting cooling wind of the radiator.

According to this first special feature, the weight of the radiator can be reduced to a large extent because the first and second tanks thereof have been made of light-weight synthetic resin. Also, since the shroud for conducting cooling wind of the radiator has been made of light-weight elastic material, and the radiator has been mounted onto the engine main unit through the shroud, the shroud is capable of performing a vibration isolation function for isolating vibrations from the engine to the radiator in addition to its original function for conducting cooling wind of the radiator. Therefore, there is no need for any vibration isolation means for exclusive use of the radiator, thus making it possible to simplify and reduce the weight of the structure. Moreover, since the radiator is light-weight as described above, the load capacity of the shroud can be reduced, whereby it is possible for the shroud to be thin, further enhancing the vibration isolation function of the structure.

Also, according to a second special feature of the present invention, the vehicle radiator device is coupled to a vehicle body frame so as to be able to rock in an up-and-down direction through a pivot shaft and is supported through a rear cushion. Since the above-described radiator is coupled to the vehicle body frame through the pivot shaft and is mounted onto the engine in the power unit and supported through the rear cushion, the reduced weight of the radiator and the shroud as described above reduces the unsprung load, and thus is capable of contributing to improved ride quality of the vehicle.

Furthermore, according to a third special feature of the present invention, the shroud is fixed to the engine by means of a fastening member, and both end portions of a conduit, through which the radiator and the water jacket are communicated with each other, are fitted in connecting holes provided on the radiator and the engine in the fastening direction of the fastening member. According to this third special feature, the shroud is fixed to the engine main unit by means of the fastening member, whereby it is possible to maintain a state in which the conduit is fitted in the connecting hole, and accordingly, no special dislocation stop means need be provided for the conduit, thus making it possible to simplify the piping structure.

Furthermore, according to a fourth special feature of the present invention, the radiator and the shroud are combined by means of rivets. According to this fourth special feature, an assembly for the radiator and the shroud is constituted, thus improving the assembling property of the engine.

In this respect, the first and second tanks, the conduit, and the fastening member correspond to the lower and upper tanks 77 and 78, the second conduit 92, and the bolt 108 in the embodiments of the present invention to be described later respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the embodiments of the present invention will be described with reference to one embodiment of the present invention shown in the accompanying drawings.

Figure 1:
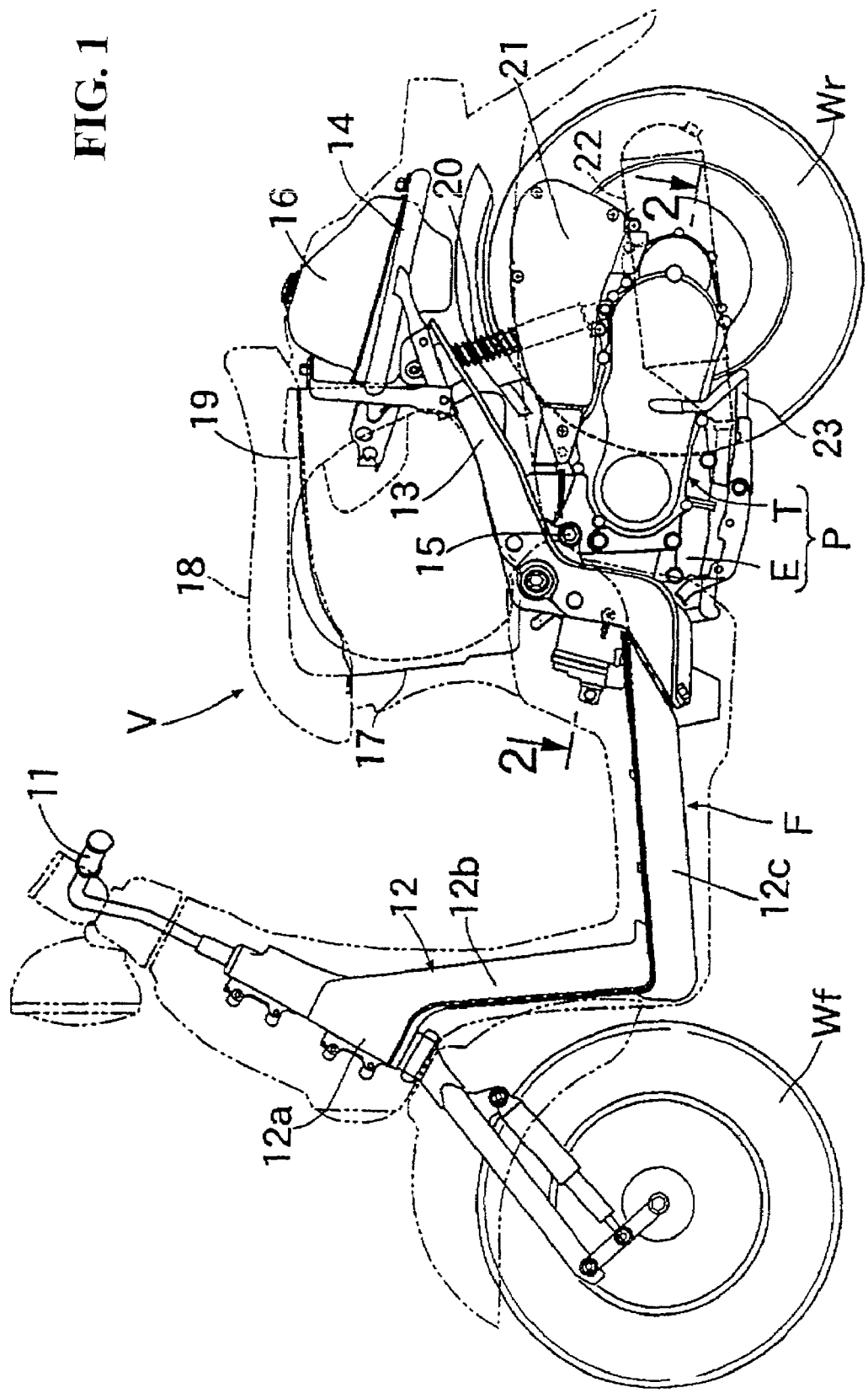
FIG. 1 is an overall side view showing a scooter type motorcycle having a vehicle radiator device according to the present invention.

First, in FIG. 1, a vehicle body frame F of a scooter type motorcycle V having a front wheel Wf to be steered by a steering handlebar 11 and a rear wheel Wr to be driven by a swing type power unit P is divided into three sections: a front frame 12, a center frame 13 and a rear frame 14. Front frame 12 is constituted by a casting of aluminum alloy integrally having a head pipe 12a, a down tube 12b and a step floor 12c. Center frame 13, by which power unit P is supported so as to able to freely rock in an up-and-down direction through a pivot shaft 15, is constituted by a casting of aluminum alloy, and is coupled to the rear end of front frame 12. Rear frame 14 extending upward behind power unit P is constituted by annular pipe material, and a fuel tank 16 is supported by rear frame 14 so as to be surrounded by it. On the top surface of center frame 13, a helmet case 17 is supported, and is integrally covered by a lid 19 having a seat 18, wherein the cover can be freely opened and closed.

Power unit P is composed of a water-cooled type single cylinder four-stroke engine E and a belt type continuously variable transmission T extending from the left side of engine E backward of the vehicle body. The top surface of the rear portion of the continuously variable transmission T is connected to the rear end of the center frame 13 through the rear cushion 20. On the top surface of the continuously variable transmission T, an air cleaner 21 is supported. On the right side of the continuously variable transmission T, a muffler 22 is supported. Further, on the underside of engine E, a main stand 23 is supported, main stand 23 being movable to either an up or a down position.

Figure 2:
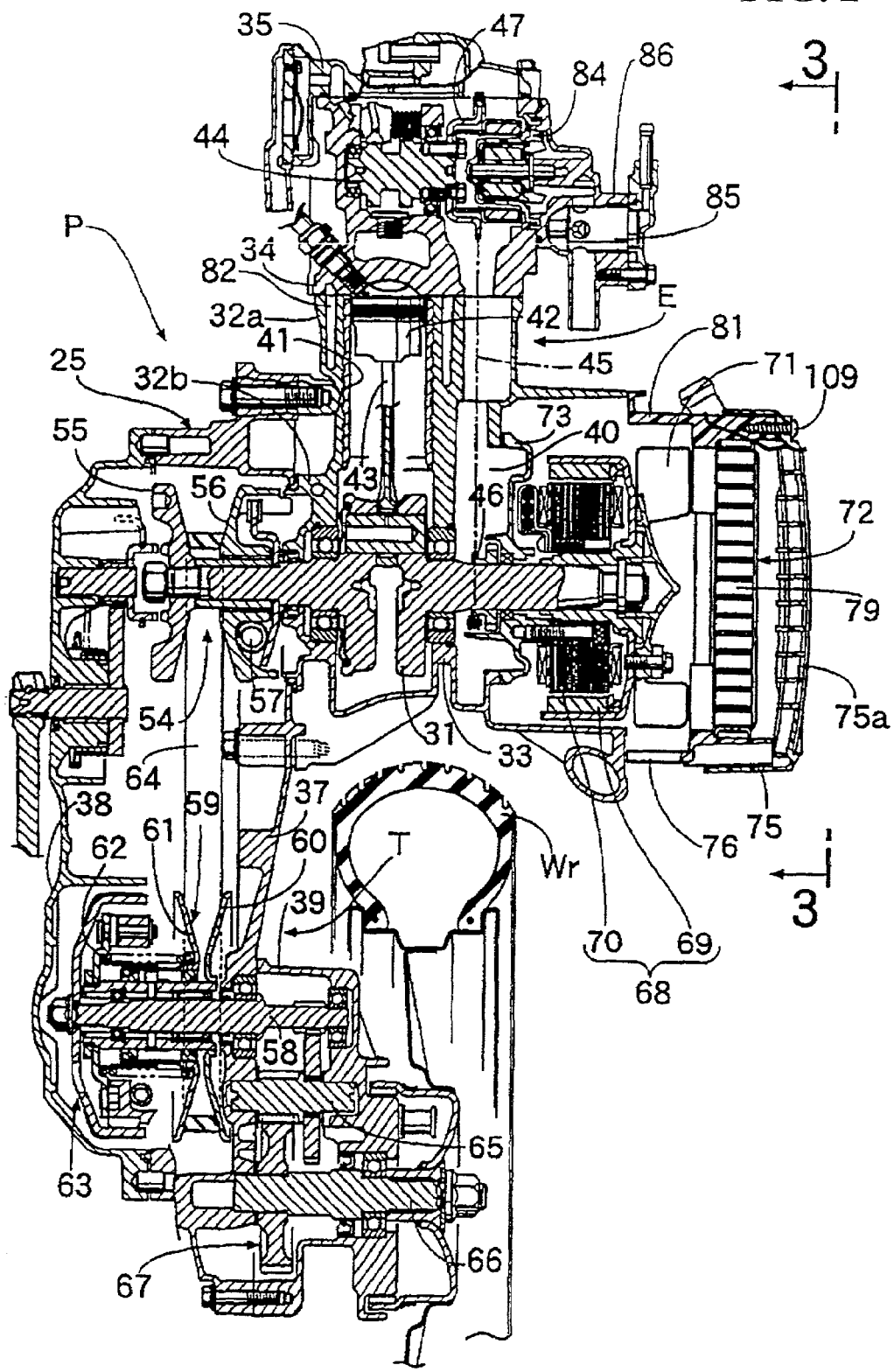
FIG. 2 is a cross-sectional view taken on line 2—2 of FIG. 1.
Figure 3:
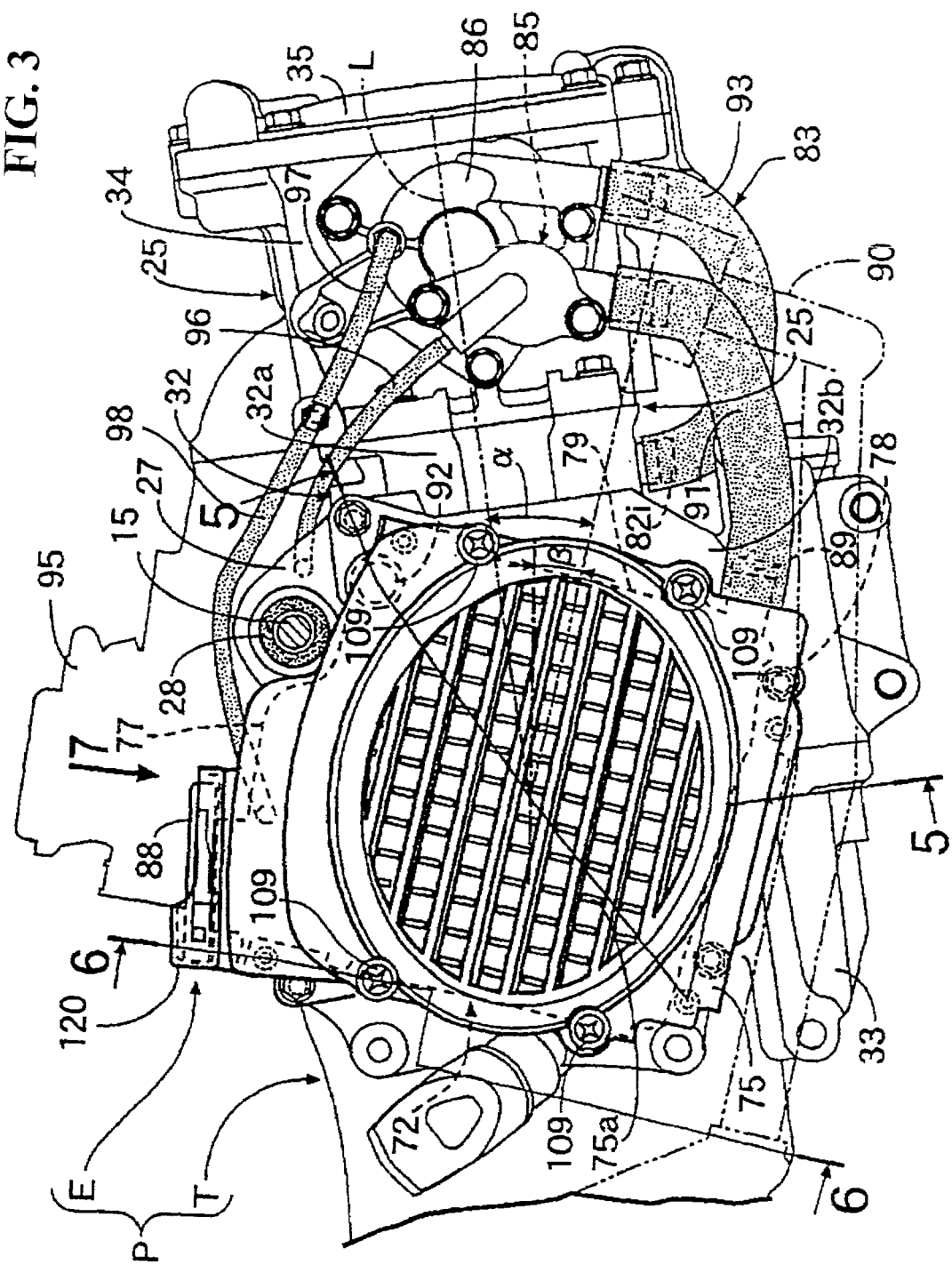
FIG. 3 is an arrow view taken on line 3—3 of FIG. 2.
Figure 4:
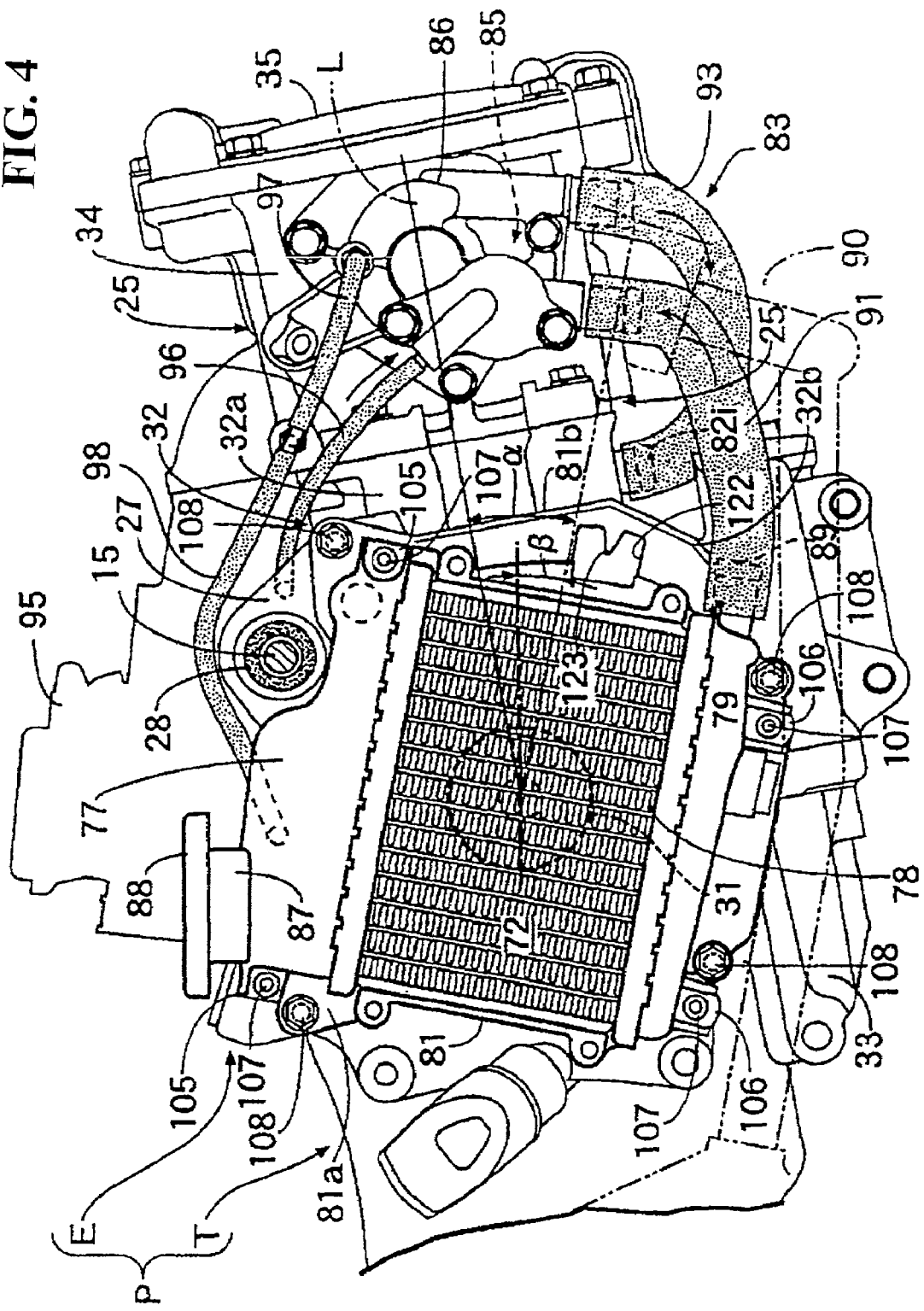
FIG. 4 is a side view corresponding to FIG. 3 in a state in which the radiator cover has been removed.

In FIGS. 2 to 4, engine main unit 25 of engine E has a first engine block 32 and a second engine block 33, which are divided by a divided surface extending along the axis of crankshaft 31 in an up-and-down direction. First engine block 32 has a cylinder block 32a having a cylinder bore 41 and a crankcase half 32b which constitutes the crankcase together with second engine block 33. At the front end of first engine block 32, a cylinder head 34 is coupled, and at front end of cylinder head 34, a head cover 35 is coupled.

Engine main unit 25 is mounted onto vehicle body frame F. Axis L of cylinder bore 41 is slightly raised toward the front substantially along the back-and-forth direction of vehicle body frame F. A bracket 27 provided above first engine block 32 is rockably coupled to a pivot shaft 15 and fixed to center frame 13 of vehicle body frame F by mount rubber 28.

The belt type continuously variable transmission T has a right-side casing 37 and a left-side casing 38, which are coupled to each other. The right side of the front part of the right-side casing 37 is coupled to the left side of the first and second engine blocks 32 and 33. Further, on the right side of the rear part of the right-side casing 37, a deceleration casing 39 is coupled.

A piston 42, which slidably fits within cylinder bore 41 of first engine block 32 is connected to crankshaft 31 through a connecting rod 43. On a cylinder head 34, a camshaft 44 is rotatably supported. An intake valve and an exhaust valve (not shown), which are provided on cylinder head 34, are opened and closed by camshaft 44. A timing chain 45 is housed within a chain passage 40 provided in first engine block 32. Timing chain 45 spans between a driving sprocket 46 provided on crankshaft 31 and a driven sprocket 47 provided on camshaft 44. Thereby, camshaft 44 makes one revolution while crankshaft 31 makes two revolutions.

A driving pulley 54 is provided at the left end of the crankshaft 31, the crankshaft 31 protruding within the right-side casing 37 and the left-side casing 38,. Driving pulley 54 has a fixed-side pulley half 55 fixed to the crankshaft 31, and a movable side pulley half 56 capable of being moved in the direction toward and away from fixed-side pulley half 55. Movable side pulley half 56 is biased in a direction toward fixed-side pulley half 55 by means of a centrifugal weight 57, which moves outwardly in a radial direction as the frequency of revolutions of crankshaft 31 increases.

A driven pulley 59 provided at an output shaft 58 is supported between the rear part of the right-side casing 37 and the deceleration casing 39, and has a fixed-side pulley half 60 relatively rotatably supported by output shaft 58, and a movable side pulley half 61 capable of being brought in the direction toward and away from the fixed-side pulley half 60. Movable side pulley half 61 is biased toward the fixed-side pulley half 60 by means of a spring 62. Also, between fixed-side pulley half 60 and output shaft 58, a starting clutch 63 is provided. Thus, an endless V-belt 64 spans between driving pulley 54 and driven pulley 59.

An intermediate shaft 65 and an axle 66 are supported between right-side casing 37 and deceleration casing 39. Intermediate shaft 65 and axle 66 are parallel with output shaft 58. A deceleration gear train 67 is provided between output shaft 58, intermediate shaft 65, and axle 66. A rear wheel Wr is mounted by spline-fitting at the right end of axle 66, which penetrates deceleration casing 39 to protrude on the right side.

Rotating power of crankshaft 31 is transmitted to driving pulley 54, and is transmitted from driving pulley 54 to rear wheel Wr through V-belt 64, driven pulley 59, starting clutch 63, and deceleration gear train 67.

During low speed rotation of engine E, a centrifugal force of driving pulley 54 exerting on centrifugal weight 57 is small. Thus, the groove width between the fixed-side pulley half 60 and the movable side pulley half 61 reduces by a spring 62 of driven pulley 59, and a gear ratio is low. When the frequency of revolutions of crankshaft 31 increases from this state, the centrifugal force exerting on centrifugal weight 57 increases. This reduces the groove width between the fixed-side pulley half 55 of driving pulley 54 and the movable side pulley half 56. In conjunction therewith, the groove width between the fixed-side pulley half 60 of driven pulley 59 and the movable side pulley half 61 increases, thereby enabling the gear ratio to vary continuously from LOW toward TOP.

Figure 5:
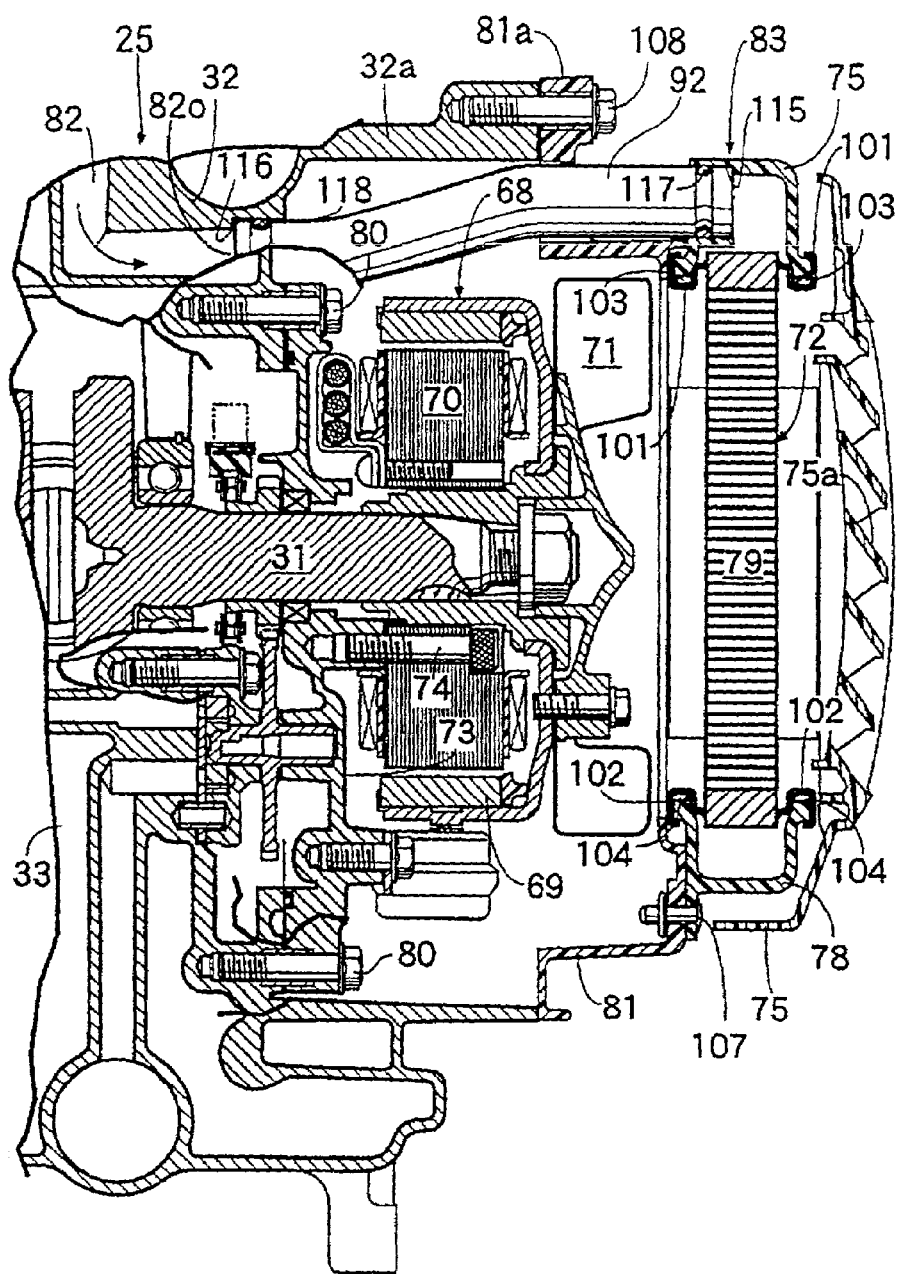
FIG. 5 is a cross-sectional view taken on line 5—5 of FIG. 3 and a vertical plan view showing a principal part of the engine in the motorcycle.

Referring to FIG. 5, a rotor 69 is fixed on the night side of crankshaft 31. Also, a stator 70 constituting an alternator 68 by cooperating with rotor 69 is fixed to a mounting base 73 by a plurality of bolts 74. Stator 70 is thus surrounded by rotor 69. Mounting base 73 is fixed to first and second engine blocks 32 and 33 by a plurality of bolts 80. A cooling fan is fixed at the right end portion of the crankshaft 31 in the outside of alternator 68. Alternator 68 is sandwiched between cooling fan 71 and radiator 72. Radiator 72 is mounted to engine main unit 25 through shroud 81 surrounding cooling fan 71.

Radiator 72 is composed of upper and lower tanks 77 and 78, which are arranged at a vertical interval, and a heat radiation core 79, through which these tanks 77 and 78 are integrally combined while their interiors communicate with each other. Heat radiation core 79 is made of metal excellent in heat radiation property. At both upper and lower end portions of heat radiation core 79, a pair of coupled protruded pieces 101 and 101; 102 and 102 protrude from side to side respectively. At the upper coupled protruded pieces 101 and 101, both left and right ends of the upper tank 77, the underside of which is opened, are caulked and combined with a sealing member 103, 103 interposed therebetween. Similarly, at the lower coupled protruded pieces 102 and 102, the left and right ends of the lower tank 78, the top surface of which is opened, are caulked and combined with a sealing member 104, 104 interposed therebetween. Upper and lower tanks 77 and 78 are both molded using synthetic resin as material.

Upper and lower tanks 77 and 78 are integrally formed with a connecting collars 105 and 106. These collars 105 and 106 are fixed to one end portion of shroud 81 by means of a plurality of rivets 107. At the other end of shroud 81, a connecting flange 81a is integrally formed, and this connecting flange 81a is fixed to engine main unit 25 by means of a plurality of bolts 108. Shroud 81 is made of elastic material such as a synthetic resin.

The outer side of radiator 72 is covered with a radiator cover 75 made of synthetic resin. Radiator cover 75 is fixed to shroud 81 by means of a plurality of screws 109. A grille 75a obtained by integrally molding with radiator cover 75 is arranged opposite to the front surface of heat radiation core 79 permitting cooling wind to be introduced into heat radiation core 79 from the outside through grille 75a.

Figure 6:
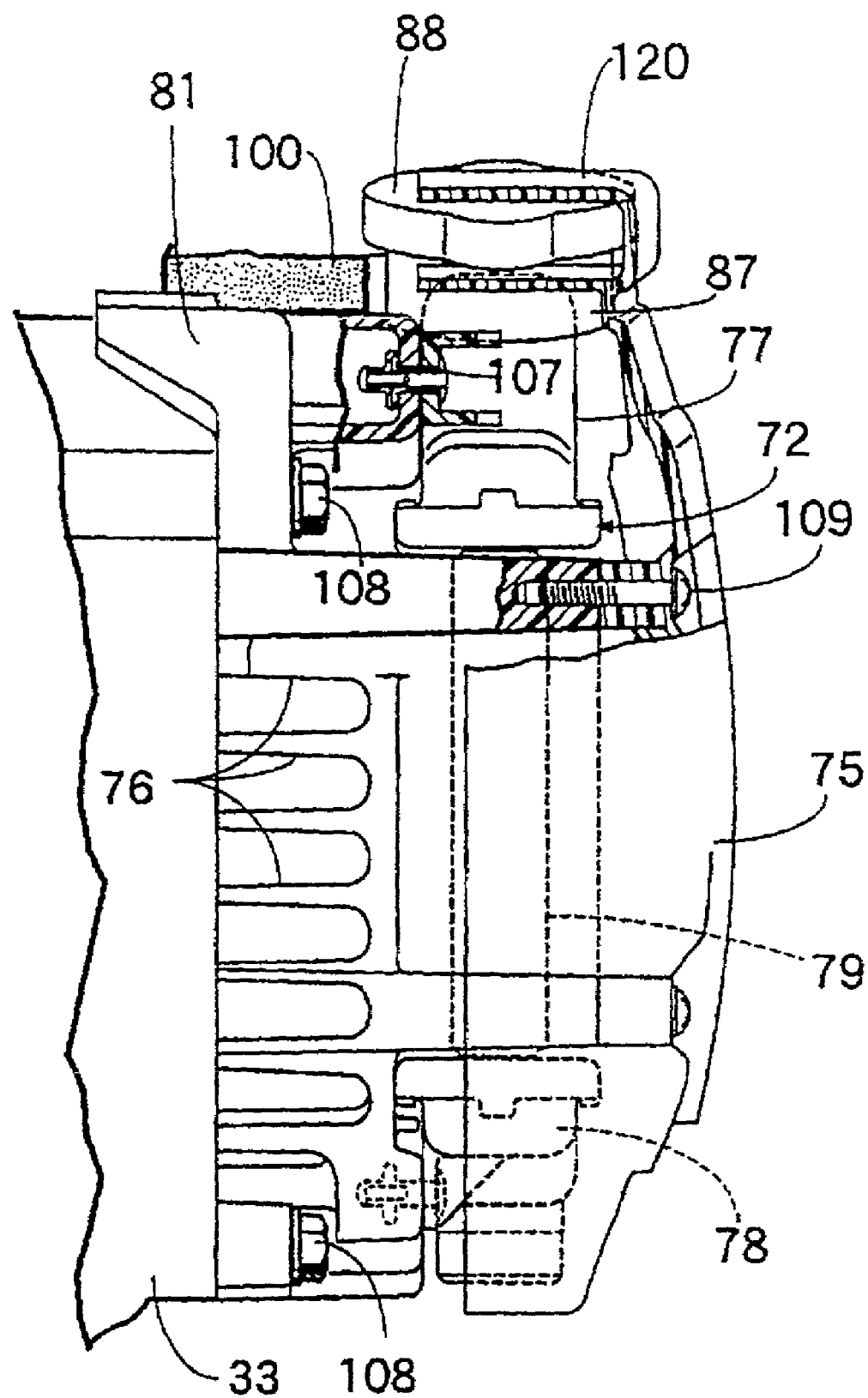
FIG. 6 is a cross-sectional view taken on line 6—6 of FIG. 3.
Figure 8:
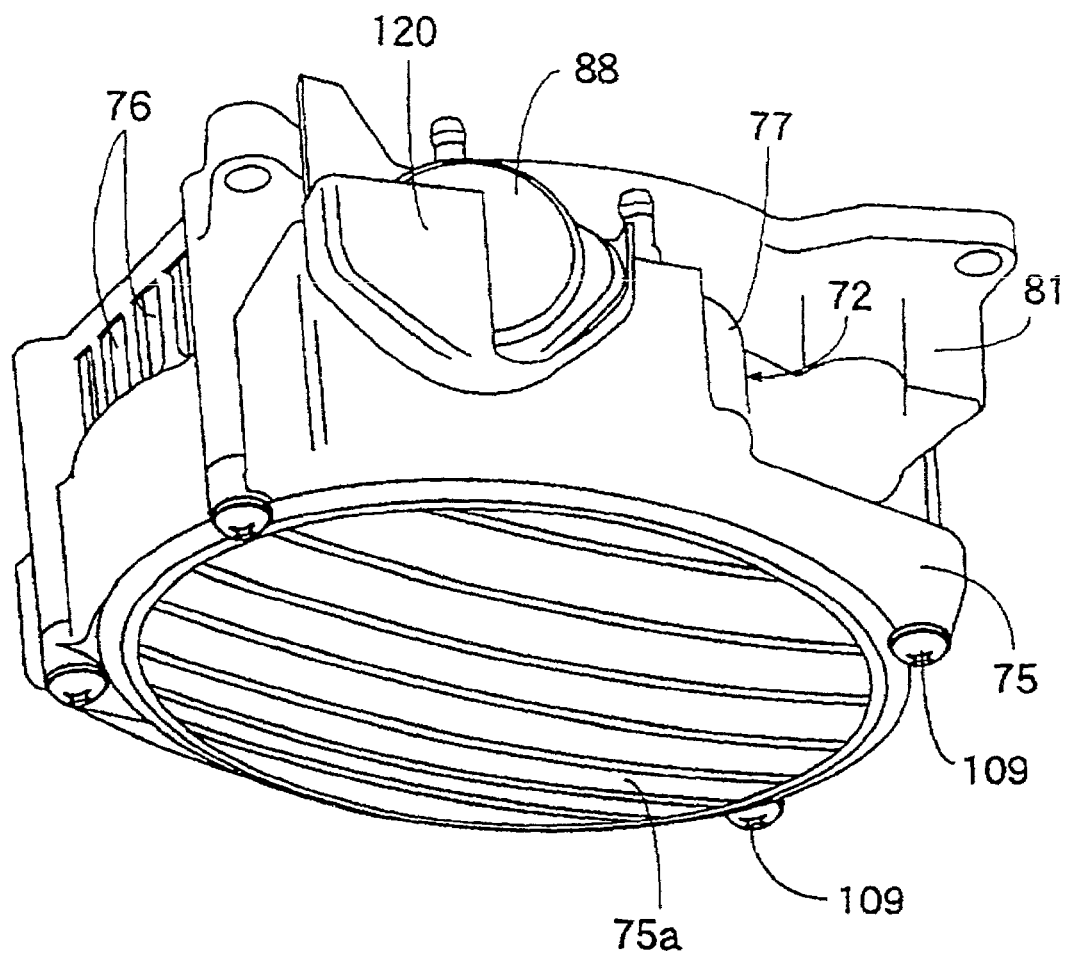
FIG. 8 is a perspective view showing a state in which the radiator cover has been attached to the radiator.

Referring to FIGS. 6 and 8 together, at the side of cooling fan 71, shroud 81 is provided with a plurality of discharge ports 76. When cooling fan 71 is operating, air introduced through grille 75a passes through heat radiation core 79 of radiator 72 to thereby cool heat radiation core 79, and is discharged to the outside through discharge ports 76. Thus, cooling water within radiator 72 is cooled.

Radiator 72 constitutes a part of a cooling device 83 capable of circulating the cooling water in a water jacket 82 provided in a cylinder block 32a and a cylinder head 34 of first engine block 32 in engine main unit 25. Cooling device 83 has a water pump 84 for supplying cooling water into water jacket 82. Radiator 72 is interposed between water jacket 82 and an intake port of water pump 84. Further, cooling system 83 has a thermostat 85 for switching between a state in which cooling water from water jacket 82 is returned to water pump 84 by making a detour to avoid radiator 72, and a state in which the cooling water which goes through radiator 72 from water jacket 82 and is returned into water pump 84. This switching from one state to the other is governed by the temperature of the cooling water.

On the right side of cylinder head 34, a thermostat case 86 housing thermostat 85 is combined therein. Water pump 84 provided at the right end of camshaft 44 is housed within space surrounded by cylinder head 34 and thermostat case 86.

A water supply port pipe 87 extending upward is integrally provided at one end portion (in this embodiment, rear end portion) of the upper tank 77 along the back-and-forth direction of vehicle body frame F. At the top end of this water supply port pipe 87, is a water supply cap 88, which can be opened and closed by a rotating operation. Also, a connecting pipe 89 protruding on the forward side of lower tank 78 is integrally provided at the other end (in this embodiment, the front end portion) along the back-and-forth direction of vehicle body frame F.

Radiator 72 is mounted onto engine main unit 25 in a inclined position by an angle α with respect to the axis L of the cylinder bore 41 of engine main unit 25. Thus, when engine main unit 25 is mounted onto vehicle body frame F, radiator 72 inclines toward the front by an angle β with respect to the horizontal surface so that water supply cap 88 is arranged at the uppermost position within cooling device 83, and a connecting pipe 89 is arranged at the lowermost position within cooling device 83. With this configuration, the expense of forming radiator 72 in a special shape, or providing a tank separate from radiator 72 is avoided. Moreover, with this simple configuration water is easily fed into water supply port pipe 87. Similarly, air bleeding through water port pipe 87 is accomplished readily due to its comparatively high position.

Also, since radiator 72 is inclined by an angle α0 with respect to axis L of cylinder bore 41 as described above, it is possible to arrange radiator 72 so as to avoid a pivot shaft 25 that supports engine main unit 25 on vehicle body frame F. This configuration also provide greater freedom in for arranging an exhaust pipe 90 which is connected to an exhaust port of cylinder head 32 behind the rear portion of radiator 72.

Connecting pipe 89 of radiator 72 is connected one end of a flexible first conduit 91 for conducting the cooling water of radiator 72 to the thermostat 85 side. Thermostat case 86 is connected to the other end of the first conduit 91. Conduit 91 is made of a rubber hose or similar material.

Radiator 72 is arranged on cylinder block 32a of engine main unit 25 in a position such that at least one portion (in this embodiment, the front portion) of upper tank 77 is superimposed, when viewed from its side, with cylinder block 32a. Upper tank 77 is provided with a connecting hole 115. Similarly, upper outlet 82o of water jacket 82 is provided with a connecting hole 116. A second conduit 92, formed from a stiff metallic pipe or similar material, and running parallel to the fastening direction of bolts 108, is fitted with sealing members such as O-rings 117 and 118 on its ends. Second conduit 92 penetrates through holes 119 provided in shroud 81 without any contact, and connects at each of its ends fitted with sealing members 117 and 118 into connecting holes 115 and 116. Also, in a fitted portion between second conduit 92 and connecting holes 115 and 116, a gap is provided for allowing second conduit 92 to rock by a micro-angle while elastically deforming sealing members 117 and 118.

Also, one end of a flexible third conduit 93 for conducting cooling water from water pump 84 is connected to thermostat case 86. The other end of third conduit 93 is connected to an inlet 82i of the lower part of water jacket 82, which protrudes in the underside of the cylinder block 32a. This third conduit 93 is made of a rubber hose or similar material.

Carburetor 95 is connected to an intake port of cylinder head 32, and a pipe line (not shown) for conducting cooling water from water jacket 82 is connected in order to heat carburetor 95. A flexible fourth conduit 96 for conducting cooling water after heating carburetor 95 to thermostat 85 is connected to thermostat case 86. The fourth conduit 96 is made of a rubber hose or similar material.

A flexible fifth conduit, also made of a rubber hose or similar material, is connected to the upper part of thermostat case 86 for bleeding water pump 84. This fifth conduit 97 and a conduit (not shown) connected to the upper part of cylinder block 32a in order to bleed the upper part within water jacket 82 are connected to a flexible sixth conduit 98, also made of rubber hose or similar material. This sixth conduit 98 is connected to the upper part of upper tank 77 on the rear side in radiator 72.

A flexible seventh conduit 100, also made of a rubber hose or similar material, connects water supply port pipe 87 to a reservoir (not shown), which is opened in the atmosphere and is separately arranged from radiator 72. Thus, when the cooling water within radiator 72 becomes hot and expands, surplus cooling water overflows from the reservoir. Conversely, when the cooling water within radiator 72 becomes low in temperature, cooling water is returned from the reservoir to radiator 72. This moving of cooling water between radiator 72 and the reservoir causes air, which has accumulated within water supply port pipe 87, to be discharged into the reservoir. This permits air bleeding from cooling device 83 to be performed satisfactorily during the operation of engine E.

Figure 7:
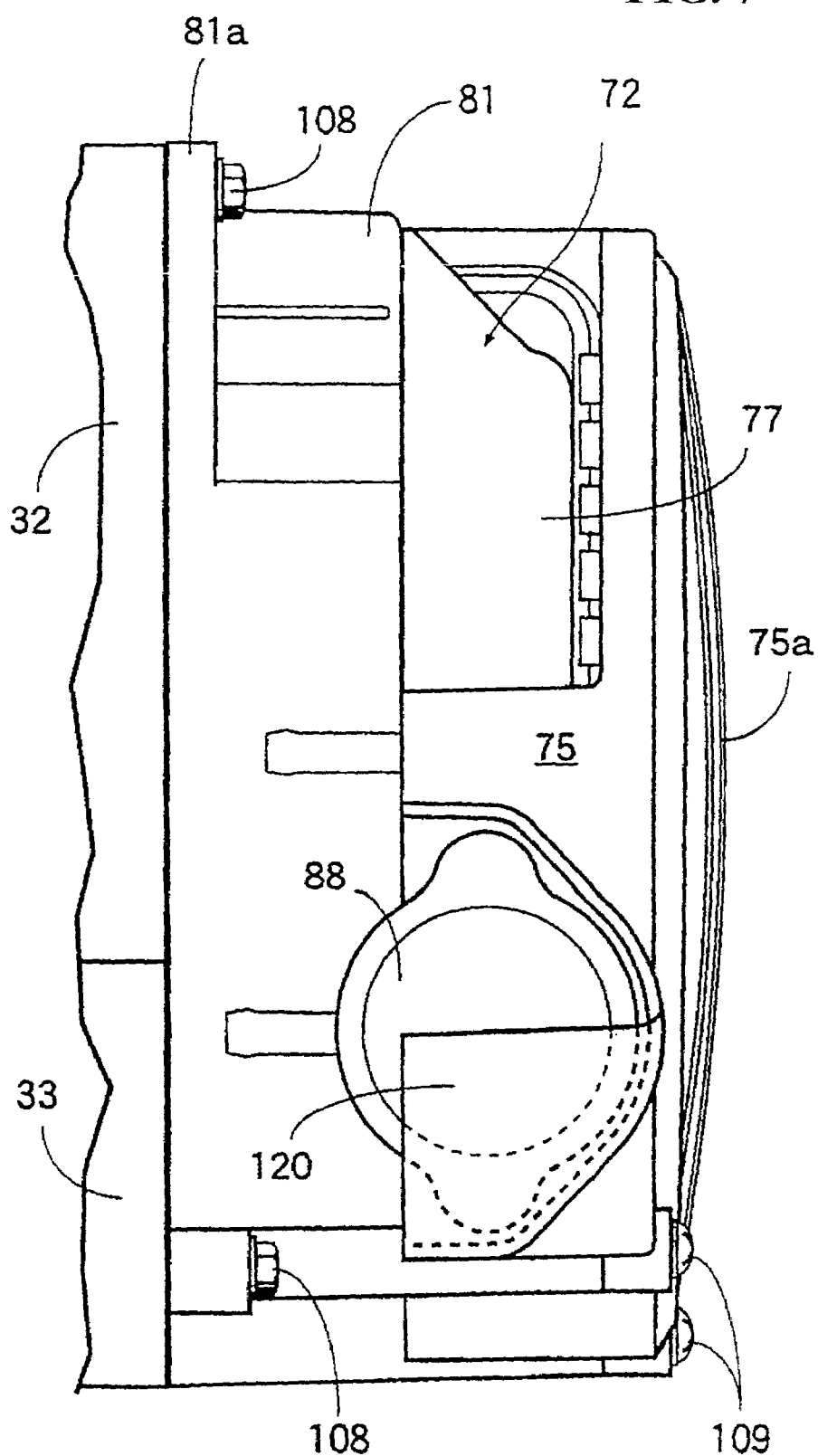
FIG. 7 is an arrow view taken on line 7 of FIG. 3.

Again in FIGS. 3, 6 and 7, radiator cover 75 has an integrated regulating unit 120 for covering one part of a water supply cap 88 of water supply port pipe 87. This regulating unit 120 prevents water supply cap 88 from being separated from water supply port pipe 87 unless cover 75 is removed.

Figure 9:
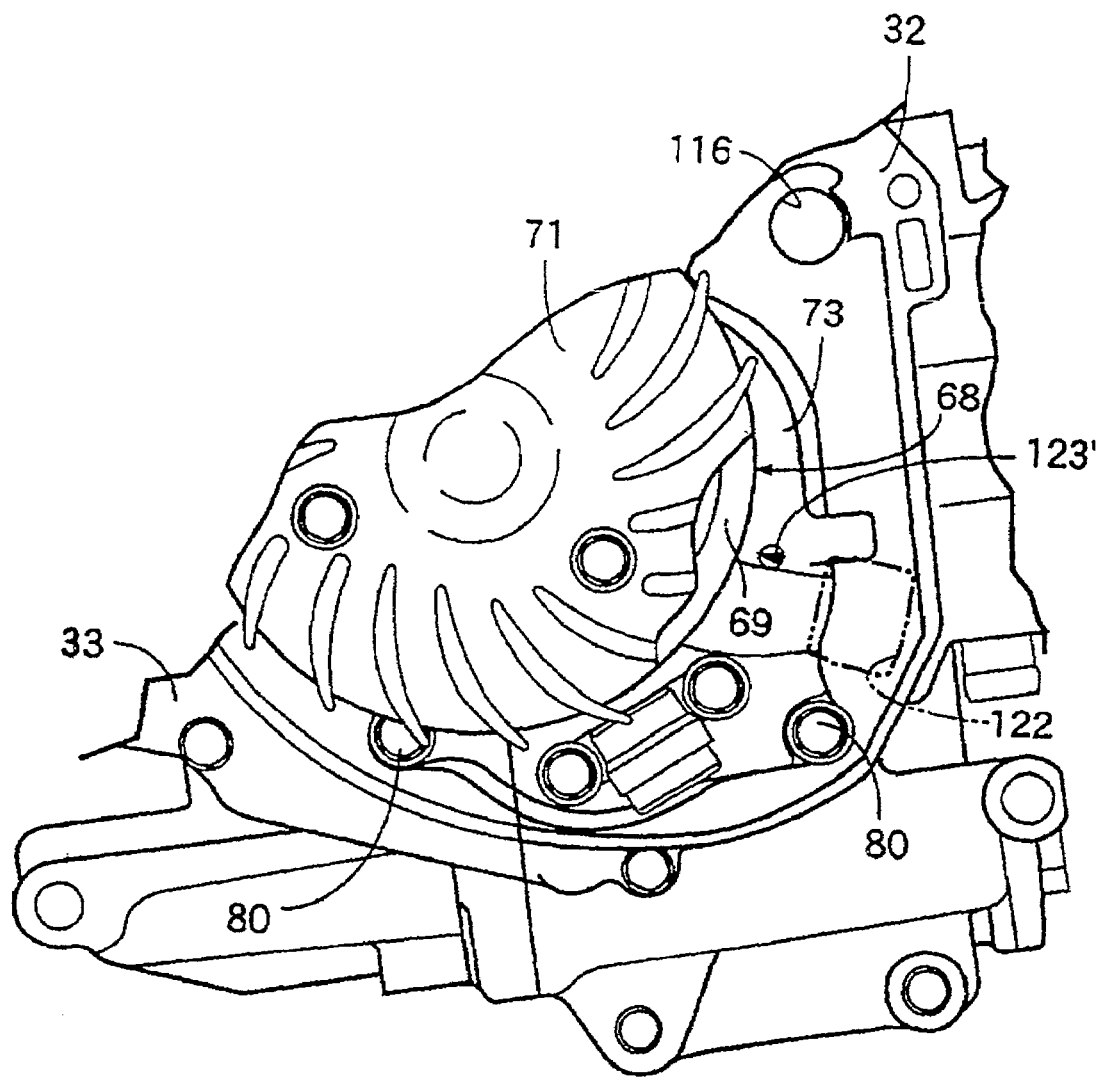
FIG. 9 is a side view showing a variation of means for detecting a crank angle position of the crankshaft.

Also, in FIG. 4, shroud 81 has an integrated overhang portion 81b overhanging one side of radiator 72. Overhang portion 81b is formed with a peep hole 122 and a pointer 123 projecting on the center side of this peep hole 122. Pointer 123 is used to detect a crank angle position of the crankshaft 31 by matching a match mark (not shown) punched at a predetermined point on an outer peripheral surface of a rotor 69 of alternator 68. With pointer 123, a maintenance operator can look through the peep hole 122, while viewing and adjusting the ignition timing. Alternatively, in place of pointer 123, as shown in FIG. 9, it is also possible to have a pointer mark 123' on the outer side surface of an installation base 73 of a stator 70. Pointer mark 123' would be used for looking through peep hole 122 to viewing whether pointer mark 123' and a match mark on the outer peripheral surface of rotor 69 match each other.

Next, a description of an operation of this embodiment will be provided.

First, consider the situation in which warming up of the engine E has been completed. In this case, cooling water discharged from water pump 84 driven by camshaft 44 is supplied to water jacket 82 within first engine block 32 and cylinder head 34 through thermostat case 86 and third conduit 93. The cooling water cools engine E while passing through water jacket 82, and thereafter, is supplied to upper tank 77 of radiator 72 through second conduit 92. Thus, the temperature of the cooling water is lowered, while flowing down from upper tank 77 to lower tank 78 through a cooling core 79, and is sucked up into water pump 84 through first conduit 91 and thermostat 85.

Secondly, consider the situation in which engine E is not fully warmed up and the temperature of the cooling water is low. Here, thermostat 85 operates causing the cooling water to make a detour so that the cooling water does not pass through radiator 72. Instead, the cooling water circulates within water jacket 82, carburetor 95, and water pump 84 causing the temperature of the cooling water to rise.

Since upper and lower tanks 77 and 78 of the radiator 72 are made of light-weight synthetic resin, it is possible to reduce the weight of radiator 72. A primary function of shroud 81 is for channeling cooling wind past radiator 72, and out through discharge ports 76. However, since shroud 81 is made of elastic material and radiator 72 is mounted to engine main unit 25 through shroud 81, shroud 81 performs another function. Because shroud 81 has elasticity of its own, it acts to absorb vibrations of the engine, thus making it possible to prevent excitation to radiator 72 from engine E.

In other words, shroud 81 has a vibration isolating role for isolating vibrations from engine E to radiator 72 in addition to its prime function of conducting cooling wind to radiator 72. Therefore, there is no need for a separate vibration isolation means for exclusive use of radiator 72. This makes it possible to simplify the structure, and accordingly, to reduce the cost of the vehicle radiator device.

Moreover, since radiator 72 is light-weight as described above, the load capacity of shroud 81 is reduced, making it possible for shroud 81 to be thin, further enhancing the vibration isolation function of the structure.

Since radiator 72 and shroud 81 have a reduced weight as compared with conventional radiator devices, another benefit accrues. Radiator 72 and shroud 81 are coupled to vehicle body frame F through pivot shaft 15, supported by rear cushion 20 and mounted onto engine E in power unit P, which rocks up and down together with rear wheel Wr. As such, radiator 72 and shroud 81 as described above reduce the unsprung load, and thus are capable of contributing to improved ride quality of the vehicle.

Another benefit of the vehicle radiator device of this invention is the simplified piping structure. Specifically second conduit 92 directly connects holes 115 and 116 through sealing members 117 and 118 respectively, in a direction parallel to the fastening direction of bolts 108. This direct connection eliminates the need for a special dislocation stop means for second conduit 92.

Moreover, since second conduit 92 is slightly rockable relative to engine main unit 25 and radiator 72, as the result the elastic deformation of sealing members 117 and 118, any vibration of engine main unit 25 permits relative displacement between engine main unit 25 and radiator 72.

Another further benefit of the present invention results from coupling shroud 81 to upper and lower tanks 77 and 78 of radiator 72 with rivets 107, thus forming an assembly for radiator 72 and shroud 81. This makes it possible to improve the assembling property of engine E.

In the foregoing, embodiments according to the present invention have been described. However, the present invention is not limited to the above-described embodiments. Various changes in design can be made without departing from the gist of the present invention. For example, radiator 72 can be also arranged such that a pair of tanks 77 and 78 are positioned horizontally. In addition, the present invention is not only applicable to motorcycles V as described above, but is also applicable to various other vehicles, such as three-wheeled vehicles.

As described above, according to the first special feature of the present invention, a vehicle radiator device having a radiator with a first tank and a second tank coupled through a heat radiation core is mounted onto an engine in a power unit to be supported by a vehicle body frame. The first tank communicates to an inlet of a water jacket of the engine and the second tank communicates to an outlet of the water jacket. The first and second tanks of the radiator are made of synthetic resin, and the radiator is mounted onto the engine through a shroud made of elastic material for conducting cooling wind of the radiator. Therefore, the shroud performs a vibration isolation function for isolating vibrations from the engine to the radiator in addition to its original function for conducting the cooling wind of the radiator. Therefore, there is no need for any vibration isolation means for exclusive use of the radiator, thus making it possible to simplify and cost of the structure. Moreover, since the radiator is light-weight as described above, the load capacity of the shroud is reduced, making it possible for it to be thin, further enhancing the vibration isolation function of the structure.

Also, according to a second special feature of the present invention, the vehicle radiator device is coupled to a vehicle body frame so as to be able to rock in an up-and-down direction through a pivot shaft, and is supported through a rear cushion. Since the above-described radiator is coupled to the vehicle body frame through the pivot shaft and is mounted onto the engine in the power unit and supported through the rear cushion, the reduced weight of the radiator and the shroud as described above reduces the unsprung load, thus contributing to improved ride quality of the vehicle.

Furthermore, according to a third special feature of the present invention, the shroud is fixed to the engine by means of a fastening member, and both end portions of a conduit, through which the radiator and the water jacket are communicated with each other, are fitted in connecting holes provided on the radiator and the engine in the fastening direction of the fastening member. According to this third special feature, the shroud is fixed to the engine main unit by means of the fastening member, whereby it is possible to maintain a state in which the conduit is fitted in the connecting hole, and accordingly, no special dislocation stop means need be provided for the conduit, thus simplifying the piping structure.

Furthermore, according to a fourth special feature of the present invention, the radiator and the shroud are combined by means of rivets. According to this fourth special feature, an assembly for the radiator and the shroud is constituted, thus improving the assembling property of the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vehicle radiator apparatus comprising:
   an engine in a power unit supported by a vehicle body frame, said engine having a water jacket;
   a heat radiation core mounted onto the engine,
      the heat radiation core having first coupled protruding pieces extending from inner and outer sides of an upper part of the radiation core, and having second coupled protruding pieces extending from inner and outer sides of a lower part of the radiation core;
   a first tank and a second tank coupled to the heat radiation core,
      said first tank communicating with an inlet of the water jacket, and said second tank communicating with an outlet of said water jacket,
      said first and second tanks being made of synthetic resin, said first tank being attached to the first coupled protruding pieces, and said second tank being attached to the second coupled protruding pieces; and
   a shroud of the radiator apparatus made of an elastic material for conducting a cooling wind through the radiator apparatus, the first tank and the second tank being mounted onto the shroud.

2. The vehicle radiator apparatus according to claim 1, wherein said shroud is fixed to said engine by a fastening member, and further including a conduit for communicating fluid between said radiator and said water jacket, said conduit including a first end fitted in a connecting hole provided on said radiator and a second end fitted in a connecting hole in said engine.

3. The vehicle radiator apparatus according to claim 2, wherein said first and said second tank are a lower tank and a upper tank respectively, said heat radiation core being disposed between said upper tank and said lower tank through which said tanks are integrally combined while their interiors communicate with each other.

4. The vehicle radiator apparatus according to claim 3, said first and second coupled protruding pieces being joined by sealing members to said upper tank and said lower tank.

5. The vehicle radiator apparatus according to claim 3, further comprising a water cap arranged on the upper tank, wherein said radiator apparatus is inclined toward a forward direction of the vehicle by an angle $\beta$ with respect to the horizontal so that said water cap is disposed at an upper most position of said upper tank, and a connecting pipe for connecting to said inlet of said water jacket is arranged at a lowermost position of said lower tank.

6. The vehicle radiator apparatus according to claim 3, wherein elastic sealing members are provided at both end portions of said conduit for connecting to said connecting hole of said water jacket and to said connecting hole of said upper tank respectively, said elastic sealing members allowing for relative displacement between the engine and the radiator apparatus when said engine vibrates.

7. The vehicle radiator apparatus according to claim 1, wherein said radiator apparatus and said shroud are connected to each other by rivets.

8. A vehicle radiator apparatus comprising:
   a vehicle body frame;
   an engine in a power unit rockably coupled to the vehicle body frame in an up-and-down direction through a pivot shaft and supported through a rear shock absorber, the engine having a water jacket;
   a heat radiation core mounted onto the engine,
      the heat radiation core having first coupled protruding pieces extending from inner and outer sides of an upper part of the heat radiation core, and having second coupled protruding pieces extending from inner and outer sides of a lower part of the heat radiation core;
   a first tank and a second tank coupled to the heat radiation core,
      said first tank communicating with an inlet of the water jacket of said engine and said second tank communicating with an outlet of said water jacket,
      said first and second tanks being made of synthetic resin, said first tank being attached to the first coupled protruding pieces and said second tank being attached to the second coupled protruding pieces; and
   a shroud of the radiator apparatus made of elastic material for conducting a cooling wind through the radiator apparatus, the first tank and the second tank being mounted onto the shroud.

9. The vehicle radiator apparatus according to claim 8, wherein said shroud is fixed to said engine by a fastening member, and further including a conduit for communicating fluid between said radiator and said water jacket, said conduit including a first end fitted in a connecting hole provided on said radiator and a second end fitted in a connecting hole in said engine.

10. The vehicle radiator apparatus according to claim 8, wherein said radiator apparatus and said shroud are connected to each other by rivets.

11. The vehicle radiator apparatus according to claim 9, wherein said first and said second tank are a lower tank and a upper tank respectively, said heat radiation core being disposed between said upper tank and said lower tank through which said tanks are integrally combined while their interiors communicate with each other.

12. The vehicle radiator apparatus according to claim 11, said first and second coupled protruding pieces being joined by sealing members to said upper tank and to said lower tank.

13. The vehicle radiator apparatus according to claim 11, further comprising a water cap arranged on said upper tank, wherein said radiator apparatus is inclined toward a forward direction of the vehicle by an angle $\beta$ with respect to the horizontal so that the water cap is disposed at an upper most position of said upper tank, and a connecting pipe for connecting to said inlet of said water jacket is arranged at a lowermost position of said lower tank.

14. The vehicle radiator apparatus according to claim 11, wherein elastic sealing members are provided at both end portions of said conduit for connecting to said connecting hole of said water jacket and to said connecting hole of said upper tank respectively, said elastic sealing members allowing for relative displacement between the engine and the radiator apparatus when said engine vibrates.

* * * * *